Figure 1:
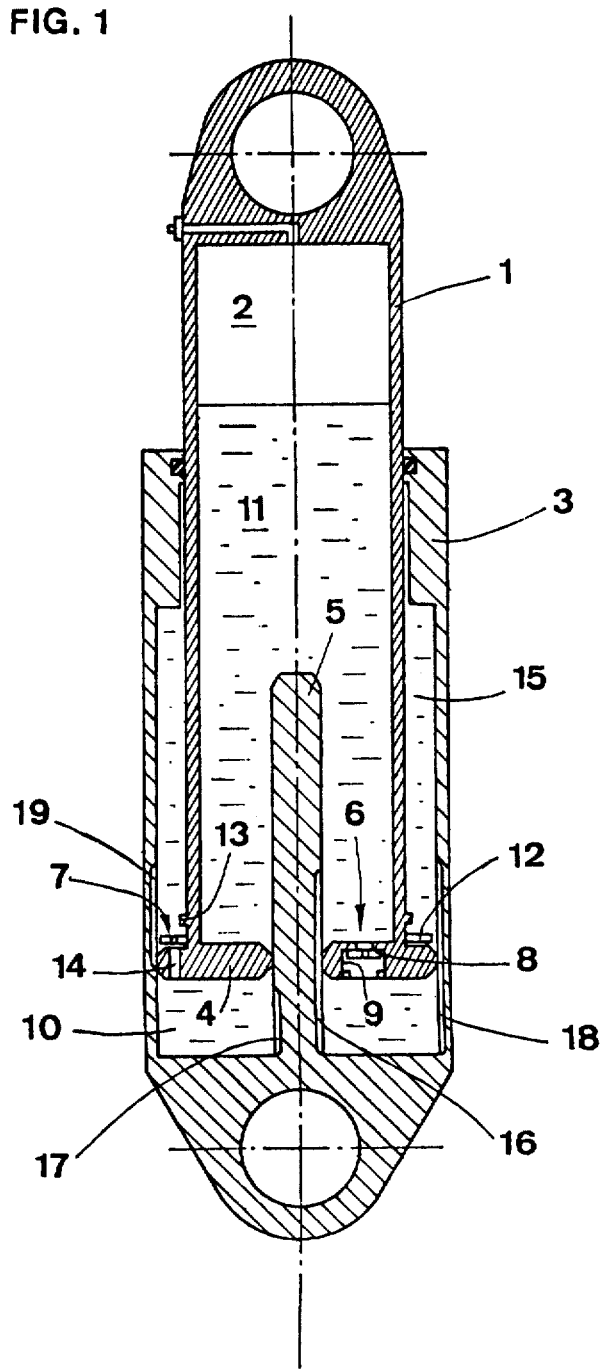

United States Patent [19]

Masclet et al.

[11] 4,405,119
[45] Sep. 20, 1983

[54] OLEOPNEUMATIC SUSPENSION WITH VARIABLE THROTTLE ORIFICES, ESPECIALLY FOR AIRCRAFT LANDING GEAR

[75] Inventors: Jean Masclet, Paris; Andre Turiot, Morsang S/Orge, both of France

[73] Assignee: Messier-Hispano-Bugatti, Montrouge, France

[21] Appl. No.: 285,790

[22] Filed: Jul. 22, 1981

Related U.S. Application Data

[63] Continuation of Ser. No. 968,471, Dec. 11, 1978, abandoned.

[30] Foreign Application Priority Data

Dec. 12, 1977 [FR] France ............................. 77 37408

[51] Int. Cl.³ ........................................... F16F 9/342
[52] U.S. Cl. ............................ 267/64.22; 188/288; 188/289; 188/317; 188/322.19; 244/104 FP; 267/64.26
[58] Field of Search ............... 188/284, 282, 288, 289, 188/314, 316, 317, 322.19; 267/8 A, 64.18, 64.22, 64.26; 244/104 FP

[56] References Cited

U.S. PATENT DOCUMENTS

| | | | |
|---|---|---|---|
| 1,780,531 | 11/1930 | Messier | 244/104 FP |
| 1,956,668 | 5/1934 | Charles | 267/64.22 |
| 2,224,306 | 12/1940 | Krueger | 267/64 R |
| 2,255,181 | 9/1941 | Newton | 188/317 X |
| 2,363,485 | 11/1944 | Down | 267/64 R |
| 2,802,664 | 8/1957 | Jackson | 267/64 R |
| 3,003,595 | 10/1961 | Patriquin | 188/287 |
| 3,469,661 | 9/1969 | Hoffmann et al. | 188/269 |

FOREIGN PATENT DOCUMENTS

| | | | |
|---|---|---|---|
| 510889 | 3/1955 | Canada | 188/284 |
| 948387 | 1/1949 | France | 188/289 |
| 73536 | 11/1953 | Netherlands | 267/64 R |
| 240566 | 6/1946 | Switzerland | 267/64 R |

Primary Examiner—George E. A. Halvosa
Attorney, Agent, or Firm—McAulay, Fields, Fisher, Goldstein & Nissen

[57] ABSTRACT

An oleopneumatic suspension with variable throttle orifices, particularly for aircraft landing gear comprising a rod (1) enclosing a pneumatic spring (2) and being fixed with respect to a piston (4) sliding in a cylinder (3), two valves (6) and (7) with permanent throttle orifices, the valve (6), which is of greater cross-section, throttling in the compression phase and the valve (7), which is of lesser cross-section, throttling in the extension phase, the suspension comprising in addition a throttle device, the section of whose orifice varies in dependence on the position and the direction of displacement of the piston (4) in the cylinder (3) so that over a given distance around a predetermined equilibrium position the orifices ensuring throttling in the compression and extension phases are of cross-sections respectively greater than the corresponding orifices over the remainder of the distance covered by the piston (4) in the cylinder (3). While primarily for use in connection with landing gear or support bogies of aircraft, the suspension is also suitable for land vehicles or for testing.

12 Claims, 5 Drawing Figures

U.S. Patent  Sep. 20, 1983  Sheet 3 of 5  4,405,119

OLEOPNEUMATIC SUSPENSION WITH VARIABLE THROTTLE ORIFICES, ESPECIALLY FOR AIRCRAFT LANDING GEAR

This is a continuation of application Ser. No. 968,471, filed Dec. 11, 1978, now abandoned.

The invention relates to oleopneumatic suspensions with vaiable throttle orifices, of the kind used especially in aircraft landing gear, vehicle support bogies or test means.

Oleopneumatic suspensions of this kind have been proposed which, when used in a landing gear, fulfil the functions of a shock absorber absorbing the greater part of the energy incident at the aircraft landing and comprising a resilient member which, in conjunction with braking action, returns to its equilibrium position by itself under the static load formed by the weight of the aircraft.

By means of the previously proposed suspensions the absorption of the energy incident upon landing is effected by throttling a hydraulic fluid through orifices calibrated to be suitable when landing takes place at an admissible vertical speed of the order of 3 m/s. Furthermore, smaller throttle orifices, which therefore increase the shock absorption and braking action, are generally used to control the extension movement of the suspension to ensure that the suspension returns without impact to its fully extended position in contact with stops after the aircraft has become airborne.

During taxiing which, with the exception of helicopters and other machines with rotating blades, precedes take-off or follows landing of the aircraft, the aircraft is likely to encounter minor obstacles, such as joints in the runway or bumps in the ground, particularly on ill-kept or unmade-up surfaces.

The joints in the runway, occurring at positions where slabs forming the runway meet, can be in the form of steps with the difference of levels as much as 30 mm for slabs approximately 8 m long, the aircraft being required to ascend or descend these steps.

Bearing in mind the landing and take-off speeds of modern aircraft, the aircraft may encounter these steps at horizontal speeds of up to 80 m/s, which, taking into account the dimensions of the wheels provided in the landing gear and the shock absorption provided by the tires, tend to subject the landing gear to a vertical speed of up to, or even in excess of 40 m/s whilst the suspension has been designed to absorb speeds of inward movement in the compression phase of 3 m/s and even lower extension speeds.

Under high speed conditions the suspension therefore can act as a rigid member transferring a high load factor to the structure of the aircraft which is not only a source of discomfort to the occupants of the aircraft but is also detrimental to the structure of the aircraft.

In contrast, with regard to helicopters and other machines with rotating blades which do not taxi at all or only to a small extent before take-off and after landing, the use of previously proposed suspensions has shown that the relatively low frequency vibrations developed by the rotating blades whilst the aircraft is still on the ground give rise to ground resonance phenomena which are particularly dangerous when the aircraft has reached the limit of its support since they can lead to the loss of stability in the machine and provoke its destruction, the maladjustment of known suspensions to the part of the aircraft exposed to ground resonance phenomena being based principally upon the existence of a high load threshold of the shock absorber in the suspension before an inward movement takes place.

According to the invention there is provided an oleopneumatic suspension to be mounted between a suspended part and a non-suspended part, comprising two members which are movable with respect to one another and of which one is to be attached to the non-suspended part and the other is to be attached to the suspended part, wherein a first of the movable members comprises a hollow rod, of which one end encloses a pneumatic spring and of which the other end is fixed with respect to a piston mounted for sliding movement in a cylinder filled with hydraulic liquid and constituting a second of the movable members; at least two valves are provided with permanent throttle orifices of different cross-sections, the orifice of greater cross-section providing throttling in the compression phase and that of lesser cross-section providing throttling in the extension phase; and a throttle device is provided with an orifice whose effective section varies in dependence of the position and the direction of displacement of the piston in the cylinder so that over at least one predetermined distance on both sides of a predetermined equilibrium position of the piston in the cylinder, under load or in the absence of an external lead being applied to the suspension, the orifice which provide throttling in the compression and extension phases have cross-sections which are respectively greater than those of the orifices ensuring throttling in the compression and extension phases for the remainder of the distance which the piston can move in the cylinder.

An oleopneumatic suspension according to the invention can provide shock absorption adapted not only to the speeds of inward movement on landing but also, for aircraft required to taxi, to the speeds of inward movement and of extension encountered during taxiing along a path, the height of which is in the order of the likely height of obstacles, on both sides of the equilibrium position under static load so as to reduce the load factor transferred by the suspension to the structure under the action of external forces which tend to move the aircraft out of its equilibrium position, and also to the ground resonance phenomena, to which machines with rotating blades are subjected, in order to enable such machines to retain good stability, the suspension being, more generally, adapted to the relatively low frequency vibrations, to which suspended members may be subjected, for example in test means.

In the case of heavy suspended parts whose weight is supported by the suspension, the suspension can be designed so that the throttle orifices in the compression phase have a cross-section greater than that of the throttle orifices in the extension phase for every position of the piston in the cylinder.

Furthermore, the suspension can be particularly designed to enable aircraft to clear isolated obstacles if, whether it be in the compression or extension phase, the cross-section of the throttle orifices effective upon each displacement out of the position of equilibrium is greater than that of the orifices effective upon each displacement into the position of equilibrium.

In contrast, in the case of suspended parts whose weight is not supported by the suspension, as may be the case with auxiliary undercarriages and air cushioned vehicles, the suspension can be such that in both the extension and compression phase and over the predetermined path on both sides of the equilibrium position the cross-section of the throttle orifices effective upon each displacement out of the equilibrium position is less than that of the orifices effective upon each displacement into the equilibrium position.

In an embodiment particularly suitable for aircraft landing gear, the throttle device of the variable section orifice of the suspension comprises a guide-rod which is fixed with respect to the bottom of the cylinder and the cross-section of which has at least one restricted portion extending axially on one side and/or the other side of the equilibrium position of the piston in the cylinder, said guide-rod passing through a passage provided in the piston and defining with the restricted portion or portions of the guide-rod the orifices with sections which are variable in the compression phase for throttling the hydraulic liquid emerging from the compression chamber defined between the piston and the bottom of the cylinder towards a first extension chamber adjacent the pneumatic spring inside the rod.

In a first variation of the above referred to embodiment, the throttle device with the variable section orifice also comprises at least one internal portion of the cylinder of enlarged cross-section extending axially on one side and/or on the other side of the equilibrium position of the piston in the cylinder and defining with the piston the orifices with variable section in the extension phase for throttling the liquid emerging from a second extension chamber, defined between the cylinder and the rod, towards the compression chamber.

In a second variation, the throttle device with variable section orifice also comprises a second guide-rod fixed with respect to the cylinder, the section of this rod has at least one restricted portion extending axially on one side and/or on the other side of the equilibrium position of the piston in the cylinder, said second guide-rod passing through a second passage provided in the piston and defining with the restricted portion or portions of the second guide-rod the orifices of variable section in the extension phase for throttling the liquid emerging from a second extension chamber, defined between the cylinder and the rod, towards the compression chamber.

In these two variations the two valves with permanent throttle orifices of different cross-sections are supported by the piston, the one of greater cross-section ensuring throttling of the liquid emerging from the compression chamber towards the first extension chamber and the free passage of the liquid in the opposite direction, the one of smaller cross-section ensuring throttling of the liquid emerging from the second extension chamber towards the compression chamber and the free passage of the liquid in the opposite direction.

In a third variation, the throttle device of variable section orifice also comprises a sleeve fixed with respect to the rod and mounted slidably to the guide-rod which is hollow, the cross-section of the sleeve having at least one restricted portion extending axially on the one side and/or on the other side of a part of the guide-rod directed back towards the sleeve when the piston is in the equilibrium position in the cylinder, this backwardly directed part of the guide-rod and the restricted portion or portions of the sleeve defining the orifices of variable section in the extension phase for throttling the liquid emerging from a second extension chamber defined respectively between the rod and the cylinder and between the rod and the guide-rod towards the compression chamber, the valves with the permanent orifice of greater cross-section being disposed in the hollow guide-rod between the sleeve and the openings which allow the compression chamber to communicate with the interior of the guide-rod to ensure that in the compression phase the liquid emerging from the compression chamber towards the two extension chambers is throttled and in the extension phase free passage in the opposite direction, the valve with the permanent orifice of lesser cross-section being supported by the rod to ensure in the extension phase that the liquid emerging from the second extension chamber towards the first is throttled, whereby the liquid returns from the first extension chamber into the compression chamber through the sleeve and to ensure in the compression phase free passage in the opposite direction.

In a fourth variation, the guide-rod is hollow and also passes through a lining coaxial with the piston and fixed with respect thereto, one part of which lining being turned back towards the guide-rod and defining with at least one restricted portion of the section of the guide-rod extending axially on one side and/or on the other side of this part, when the piston is in the equilibrium position in the cylinder, the orifices of variable section in the extension phase for throttling the liquid emerging from a second extension chamber, defined respectively between the rod and the cylinder and between the rod and the guide-rod, towards the compression chamber, the valve with the permanent orifice of larger section being disposed in the guide-rod communicating with the compression chamber to ensure in the compression phase the throttling of the liquid emerging from the compression chamber towards the first extension chamber through the guide-rod and in the extension phase the free passage in the opposite direction, and the valve with the permanent orifice of lesser section being supported by the free end of the guide-rods which is in the shape of an enlarged head sliding in the rod, to ensure in the extension phase the throttling of the liquid from the second extension chamber towards the first, whence the liquid returns to the compression chamber through the guide-rod and in the compression phase the free passage in the opposite direction.

This fourth variation is itself capable of becoming the subject of an adaptation rendering it particularly suitable for the landing gear of aircraft with rotating blades sensitive to ground resonance phenomena as well as for test means, the section of the second extension chamber defined between the rod and the cylinder enclosing here a second pneumatic spring, the effect of which is directly opposite to that of the first pneumatic spring disposed in the rod.

This second pneumatic spring, which tends to cause the rod to move into the cylinder, constitutes or is because the second spring is in itself the anti-threshold spring reducing the minimum suspension load for which an inward movement takes place.

Finally, it is advantageous in some embodiments and with the suspension in the extended position against stops, for the guide-rod to provide the piston with permanent communication between the compression chamber and the first extension chamber so as to ensure the return of the gas to the pneumatic spring irrespective of previous inclination of the suspension.

Figure 2:
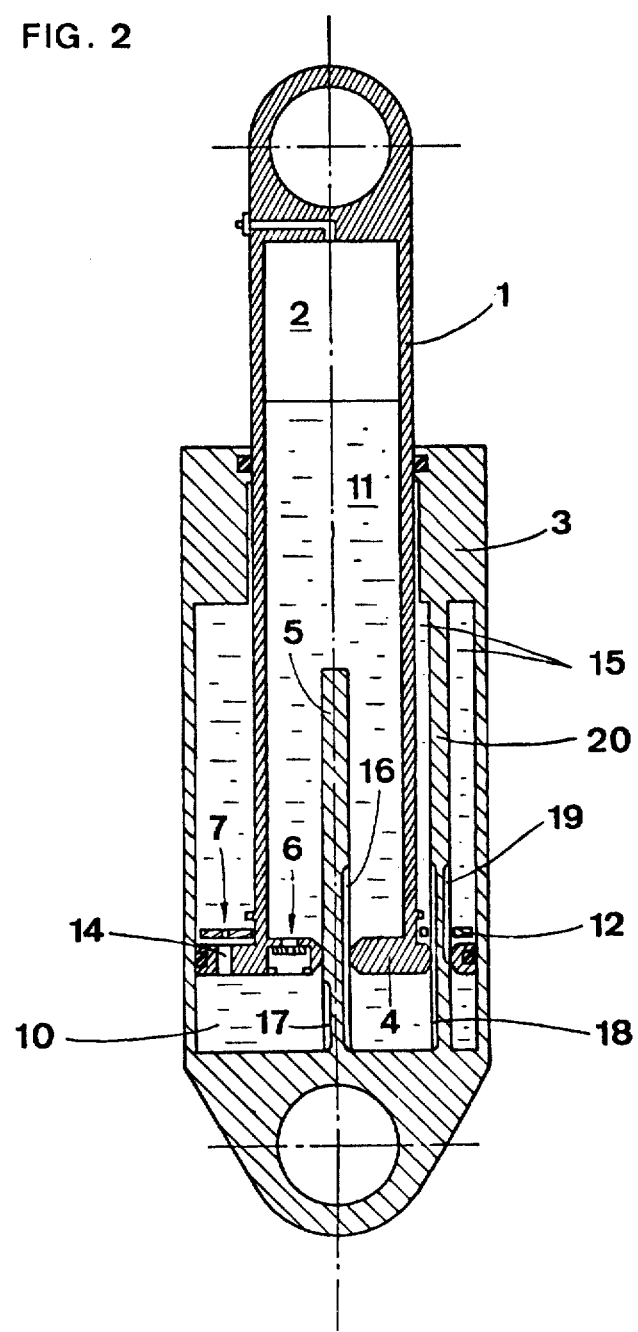
Figure 3:
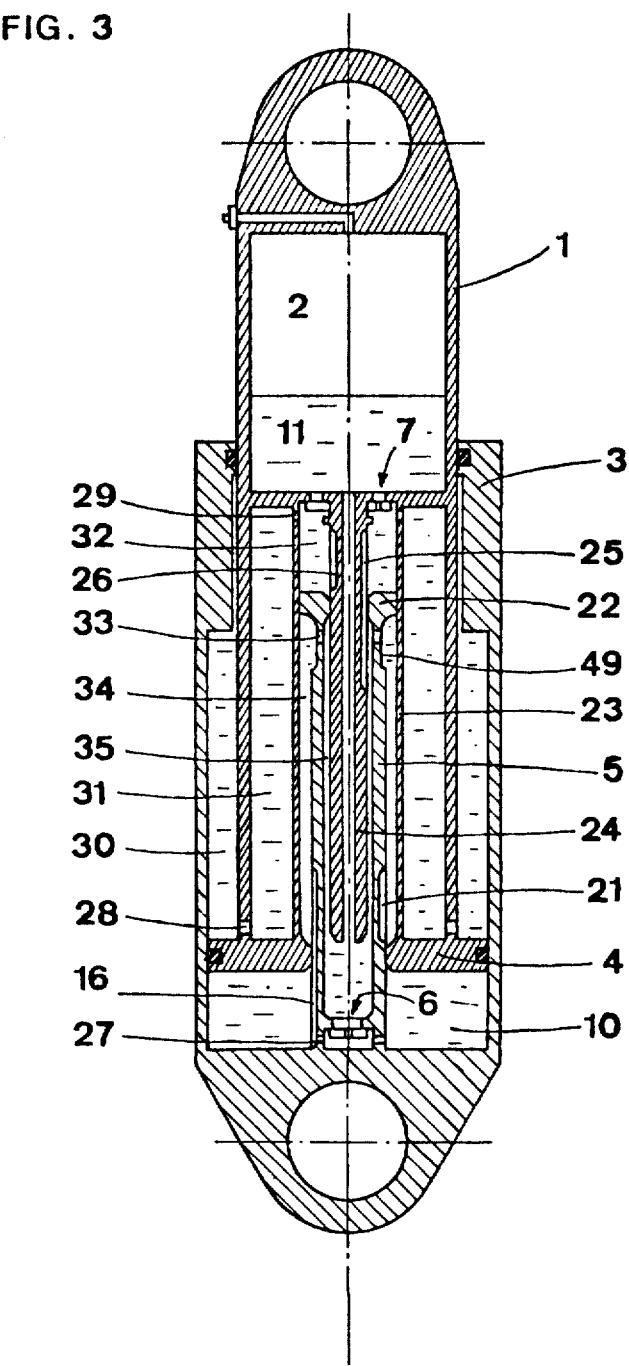
Figure 4:
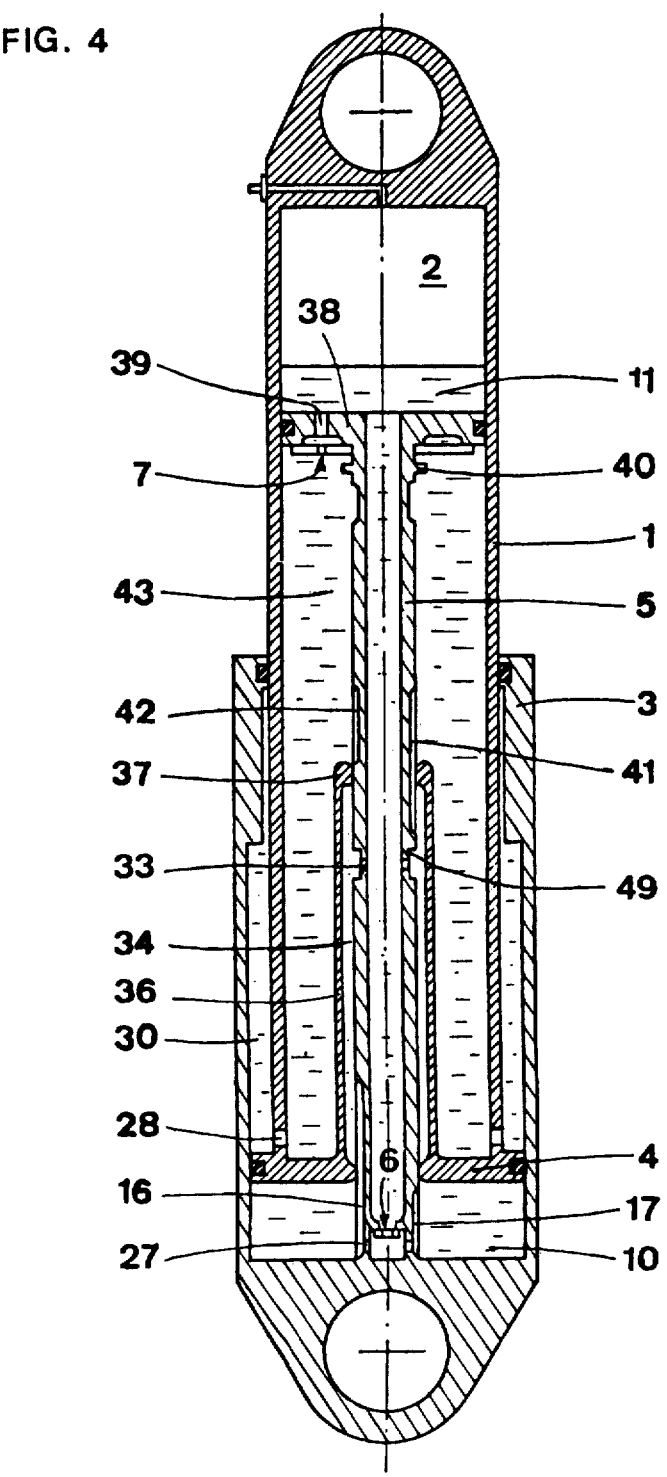
Figure 5:
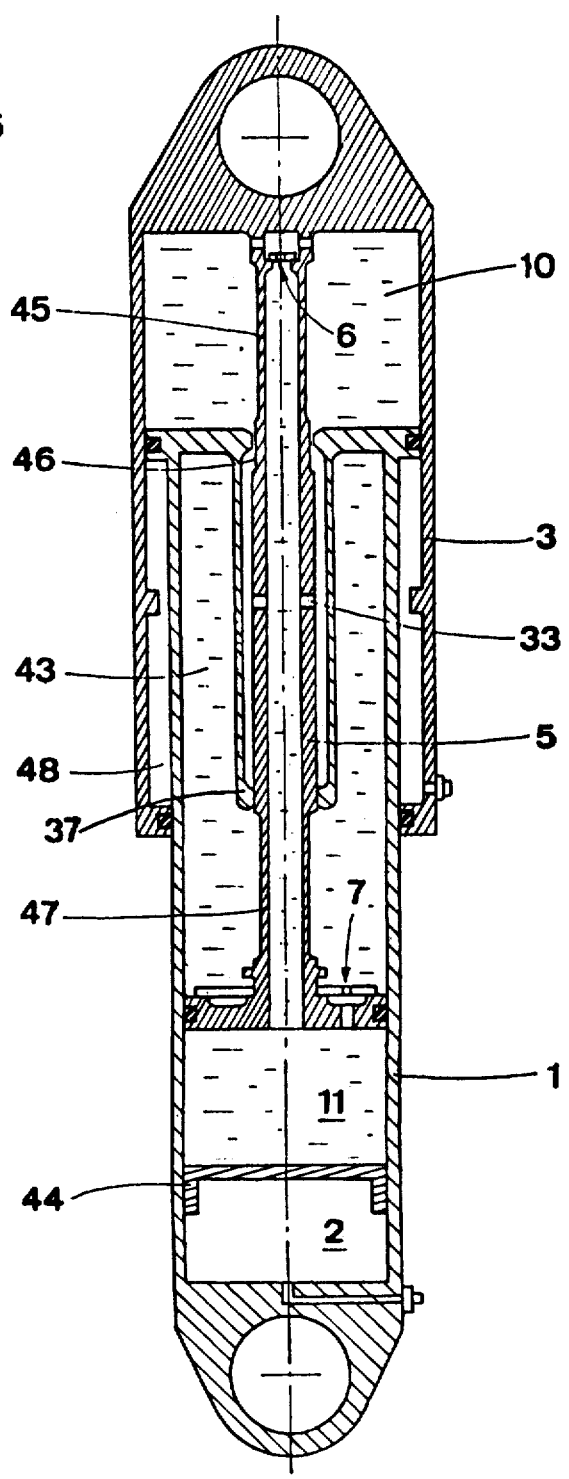

The invention is diagrammatically illustrated by way of example with reference to the accompanying drawings, in which:

FIG. 1 is an axial section through a first embodiment of an oleopneumatic suspension according to the invention;

FIGS. 2, 3 and 4 are similar views of second, third and fourth embodiments respectively of the invention, the first, second and fourth embodiments being more especially designed for the landing gear of aircraft while the third embodiment is suitable for auxiliary support bogies of land vehicles or for use on the ground; and FIG. 5 is a similar view of a fifth embodiment of the invention intended for use in the undercarriage of helicopters.

Referring to the drawings and firstly to FIG. 1, an oleopneumatic suspension comprises a hollow rod 1 to be attached to the frame of an aircraft for example constituting the mass to be suspended or of the landing gear of the aircraft by way of one end enclosing a pneumatic spring 2 formed by a chamber of pressurized gas.

The rod 1 is sealingly mounted for sliding movement inside a cylinder 3 filled with hydraulic liquid and to be attached to a member supporting the wheel or wheels, (included in the non-suspended mass), and a piston 4, fixed with respect to the end of the rod 1 inside the cylinder 2, is mounted for sliding movement in the cylinder 3.

A guide-rod 5, fixed with respect to the bottom of the cylinder 3, passes through a central passage provided in the piston 4, which piston includes two valves 6 and 7 with permanent throttle orifices of different cross-section. The valve 6 comprises a washer 8 having a central throttle orifice therein, the washer 8 being held captive in a recess 9 in the piston providing communication between a compression chamber 10 and a first extension chamber 11, whilst the valve 7 comprises a ring 12 surrounding the rod 1 and located between the piston 4 and an abutment 13 on the rod 1. The ring 12 is pierced by a throttle orifice disposed opposite a passage 14 provided in the piston 4 and providing communication between the compression chamber 10 and a second extension chamber 15. The throttle orifice of the valve 6 has a greater cross-section than that of the throttle orifice of the valve 7. Furthermore, grooves 16, 17 and 18, 19 are provided in the outer face of the guide-rod 5 and in the inner face of the cylinder 3 respectively, which grooves extend over a predetermined length, some on both sides, others on one side or the other, of a equilibrium position of the piston 4 in the cylinder 3. The equilibrium position corresponds to the position which will be adopted under static load constituted by the weight of the aircraft exerted on the suspension which can be so calculated that the static load corresponds to an inward movement of approximately 75% of the total length of travel of the piston 4 in the cylinder 3, the equilibrium position being shown in FIG. 1.

The suspension thus described operates in the following manner: from the fully extended position, such as is obtained before landing by the effect of the pneumatic spring 2 which tends to push the rod 1 out of the cylinder 3, the absorption of the incident energy at landing is effected in the compression phase when the rod 1 is moved into the cylinder 3 by the throttling of the hydraulic liquid passing from the compression chamber 10 to the first extension chamber 11 through the valve 6 over the greater part of the path before reaching a position corresponding to the static load, then, up to a final position, through the valve 6 and the groove 16 uncovered by the piston 4, finally, beyond the position corresponding to the static load through the valve 6 and the grooves 16, 17.

At the same time the hydraulic liquid flows freely from the compression chamber 10 to the second extension chamber 15 since the valve 7 is open, the ring 12 being displaced towards the abutment 13 due to the action of the liquid passing through the passage 14.

The incident energy on landing having been absorbed, the return to the equilibrium position will take place in the extension phase, the free return of the liquid from the first extension chamber 11 to the compression chamber 10 being ensured by the opening of the valve 6, the outward movement of the rod 1 being restrained by the throttling of the liquid passing from the second extension chamber 15 to the compression chamber 10 through the valve 7 and the groove 18, the cross-section of which is smaller than that of the groove 16, up to the equilibrium position.

From this position, if, during taxiing, the aircraft is required respectively to descend or ascend joints on the runway, the height of which does not exceed the length defined by the grooves, the suspension will operate respectively in the extension phase or the compression phase so that in the extension phase any displacement out of the equilibrium position will be braked by throttling through the valve 7 and the groove 18 and 19, the section of groove 19 being smaller than that of groove 17, with return in the compression phase and throttling through valve 6 and groove 16 and in the compression phase any displacement out of the equilibrium position will be braked by throttling through valve 6 and grooves 16 and 17 with return in the extension phase and throttling through valve 7 and groove 18.

Finally, following take-off, return to the fully extended position will be effected with throttling through valve 7 and grooves 18 and 19 over a first section of the path, then through valve 7 only.

The guide-rod 5, the section of which has a restricted portion extending axially on both sides of the position under static load, due to the grooves 16 and 17, and the cylinder, of which one internal portion has an enlarged section extending axially on both sides of the same position, due to the grooves 18 and 19, define thus with the piston 4 respectively the orifices of variable section in the compression phase and the orifices of variable section in the extension phase of a throttle device with an orifice whose section varies as a function of the position and the direction of displacement of the piston 4 in the cylinder 3, so that over a given distance, corresponding to the height of the isolated obstacles which the aircraft is likely to encounter, on both sides of the position under static load the throttle orifices, both in the compression and the extension phase, are of greater cross-section than the orifices corresponding respectively over the remainder of the distance which the piston 4 may travel in the cylinder 3, which thus enables the throttle orifices to be adapted to the speeds of inward and outward movement of the rod, these speeds being low at landing and after take-off in relation to the speeds at which the aircraft clears the isolated obstacles during taxiing. Taking into account the respective sections of the throttle orifices of the valves and the grooves, it will be apparent that for every position of the piston in the cylinder the throttle orifices in the compression phase are of greater cross-section than the throttle orifices in the extension phase, thus providing improved absorption of the effect of bumps in the runway on the heavy suspended mass constituted by an aircraft of great weight. Furthermore, it is noted that for distances whether in the extension phase or the compression phase the active throttle orifices are for every displacement out of the equilibrium position of greater cross-section than the active orifices for every displacement into the equilibrium position, which thus provides a return to this equilibrium position which is effected with greater shock absorption so as to reduce the oscillations until stabilization in the equilibrium position, which will be reached before the following obstacle is encountered.

The second embodiment, illustrated in FIG. 2, only differs from the first embodiment with respect to the plan of the structure: the piston 4 is sealingly mounted for sliding movement in the non-grooved cylinder 3, the grooves 18 and 19 being formed on a second guide-rod 20, which is fixed with respect to the cylinder 3 and passes through an additional passage provided in the piston 4 and in the ring 12 of the valve 7. The orifices of variable cross-section in the extension phase are thus defined by the second guide-rod 20 and the piston 4, the operation of this second embodiment being substantially identical to that of the first embodiment.

In the embodiment illustrated in FIG. 3, there is provided a piston 4 fixed with respect to one end of a hollow rod 1 enclosing at its other end a pneumatic spring 2, the rod 1 and the piston 4 being sealingly mounted for sliding movement in a cylinder 3 filled with hydraulic liquid.

There is also provided a guide-rod 5, fixed with respect to the bottom of the cylinder 3, with a cross-section having a restricted portion extending axially on both sides of the equilibrium position of the piston in the cylinder, which corresponds to the position under static load, due to grooves 16 and 21, the guide-rod 5 passing through the piston 4 and defining with this piston, by virtue of the grooves 16 and 21, orifices of variable section in the compression phase for throttling the liquid passing from the compression chamber 10 to the first extension chamber 11. In this configuration, the guide-rod 5 is hollow and its free end has an enlarged head 22 guided inside a lining 23 which is fixed with respect to the rod 1 and outside a sleeve 24 also fixed with respect to the rod 1 and penetrating the guide-rod 5. The section of the sleeve 24 also has an axial restricted portion formed by grooves 25 and 26 in the sleeve 24 and extending axially on both sides for 25 and one one side only for 26 of the position occupied by the head 22 of the guide-rod 5 when the piston 4 is in the equilibrium position in the cylinder 3, the head 22 and the grooves 25 and 26 defining the orifice of variable section in the extension phase. The valve 6 with the permanent orifice of greater cross-section is disposed in the hollow guide-rod 5 between the free end of the sleeve 24 and passages 27 for communication between the compression chamber 10 and the interior of the guide-rod 5. For its part, the valve 7, which has the permanent orifice of smaller cross-section, is disposed at the foot of the sleeve 24 supported by the rod 1. By virtue of passages 28 and 29, annular chambers 30, 31 and 32 defined respectively between the cylinder 3 and the rod 1, the rod 1 and the lining 23 and the lining 23, the sleeve 24 and the head 22, communicate with one another. In the same way, by virtue of passages 33 formed in the guide-rod 5, annular passages 34 and 35, defined respectively between the lining 23 and the guide-rod 5, and between the guide-rod 5 and the sleeve 24 communicate with one another and, by way of the sleeve 24, with the extension chamber 11.

In this way, in the compression phase, the liquid is permanently throttled through the valve 6 as it comes from the compression chamber 10 towards the first extension chamber 11 and over the distance defined by the grooves 16 and 21 through the grooves 16 and 21 before the equilibrium position and through the groove 16 only after this position, the liquid passing through this groove or these grooves from the chamber 10 to the chamber 11 through the annular passages 34 and 35 and the sleeve 24, the valve 7 constantly ensuring in the compression phase the free passage of the liquid from the chamber 11 to the annular chamber 32 and the second extension chamber formed by the two annular chambers 30 and 31.

In contrast, in the extension phase, permanent throttling is effected through the valve 7, the liquid passing from the annular chambers 30, 31 and 32 to the chamber 11 and from the chamber 11 to the chamber 10 through the sleeve 24 and the valve 6 which is open. Over the distance defined by the grooves 25 and 26 in the extension phase towards the equilibrium position, throttling is effected further through the grooves 25 and 26 and in the extension phase out of the equilibrium position through the grooves 25 in addition to the valve 7.

Since the grooves 16 and 21 are respectively of greater cross-section than the grooves 25 and 26, then a suspension is provided whose throttle orifices are of greater cross-section, both in the extension and the compression phase, over the predetermined distance around the equilibrium position than the orifices along the remainder of the distance over which the piston 4 can travel in the cylinder 3, the throttle orifices in the compression phase being of greater cross-section than the throttle orifices in the extension phase for every position of the piston in the cylinder.

In contrast, over the predetermined distance on both sides of the equilibrium position, be it in the compression or the extension phase, the cross-section of the throttle orifices effective upon each displacement out of the equilibrium position is smaller than that of the orifices effective upon every displacement into this position.

In the embodiment illustrated in FIG. 4, there is provided a hollow guide-rod 5 fixed with respect to the bottom of the cylinder 3, and passing through a central passage provided in the piston 4 which is supported by the end of a hollow rod 1 enclosing a pneumatic spring 2, the rod 1 and the piston 4 being sealingly mounted for sliding movement in the cylinder 3, the valve 6 with the permanent throttle orifice in the compression phase being disposed in the lower portion of the hollow guide-rod 5, the interior of which communicates with the compression chamber 10 by way of the passages 27. It can also be seen that the grooves 16 and 17 provided on the guide-rod 5 on both sides for 16 and on one side only for 17 of the equilibrium position of the piston 4 in the cylinder, define with the piston 4 the orifices of variable section in the compression phase for throttling the liquid passing from the compression chamber 10 into the first extension chamber 11 adjacent the pneumatic spring 2 through an annular passage 34, defined between the guide-rod 5 and a lining 36 which is fixed with respect to the piston 4, then, by virtue of the communication orifices 33, through the guide-rod 5.

In contrast, in this configuration the free end of the lining 36 is in the shape of a collar 37 turned inwards towards the guide-rod 5, the free end of which guide-rod 5 is in the shape of an enlarged head 38, which slides in a sealed manner inside the hollow rod 1 and supports the valve 7 of permanent throttle orifice in the extension phase. The valve 7 comprises a ring through which an orifice of smaller cross-section is pierced and which is situated opposite a passage 39 provided in the enlarged head 38 and its movements are limited on one side by the enlarged head 38 and on the other side by an abutment 40 on the guide-rod 5. Furthermore, grooves 41 and 42 provided in the guide-rod 5 on both sides for 41 and on one side only for 42 of the position occupied by the cellar 37 when the piston 4 is in the equilibrium position in the cylinder 3, define with the collar 37 orifices of variable section in the extension phase for throttling the liquid passing from the chamber 30 and a chamber 43 in communication by the orifices 28 and defining a second extension chamber, to the compression chamber 10 by way of an annular passage 34, the orifices 33 and the guide-rod 5, the valve 6 being open, and also by way of the grooves 17 and 16.

The suspension described above operates in the following manner: in the compression phase and outside of the distance determined by the grooves 16 and 17 for the piston 4 and the grooves 41 and 42 for the collar 37, the liquid driven out of the compression chamber 10 by the piston 4 is throttled by the valve 6 and rises up into the first extension chamber 11, whence it flows towards the second extension chamber formed by the chambers 43 and 30, the valve 7 being open due to the effect of the pressure exerted by the pneumatic spring 2 on the liquid in the chamber 11.

In the compression phase and over the distance determined by the grooves 17, 41 and 42 throttling is effected through the valve 6 and the groove 16 before the equilibrium position and through the valve 6 and the grooves 16 and 17 after the equilibrium position.

Upon return in the extension phase into the equilibrium position, the liquid in the chambers 30 and 43 is throttled on the one hand through the valve 7 which is closed, towards the first extension chamber 11, with return under the pressure due to the pneumatic spring 2 towards the compression chamber 10 through the interior of the guide-rod 5 and through the valve 6 which is open, and on the other hand through the groove 41 towards the annular passage 34 and the chamber 10, either through the grooves 16 and 17 or through the orifices 33, inside the guide-rod 5 and the valve 6. In the extension phase out of the equilibrium position, the only difference from the foregoing is that over the distance defined by the grooves 41 and 42 throttling is effected through the valve 7 and the grooves 41 and 42, then beyond this distance through the valve 7 only.

Thus it can be seen that operation is substantially identical to that obtained by the use of the suspensions according to the previously described embodiments.

FIG. 5 illustrates another embodiment, the structure of which is scarcely different from that illustrated in FIG. 4. The only significant differences are that the pneumatic spring 2 is is separated from the first adjacent extension chamber 11 by a separator piston 44, which enables the suspension to be attached to the suspended portion by way of the cylinder 3 and to the non-suspended portion by way of the hollow rod 1, and that the restricted portions in the cross-section of the guide-rod 5 are obtained not by forming grooves in the guide-rod but on the one hand by means of staggered annular restricted portions 45 and 46 extending axially on both sides of the equilibrium position of the piston 4 in the cylinder 3 so as to define with the piston 4 orifices of variable section for throttling in the compression phase, and on the other hand by means of an annular restricted portion 47, extending axially on one side of the position occupied by the collar 37 when the piston 4 is in the equilibrium position so as to define with the collar 37 orifices of variable section for throttling in the extension phase. Finally, the chamber 43 does not communicate with the annular chamber defined between the rod 1 and the cylinder 3, the rod 1 enclosing a second pneumatic spring 48 which acts in opposition to the first pneumatic spring 2.

In this configurationn, the two pneumatic springs 2 and 48 acting in opposition define the equilibrium position of the piston 4 in the cylinder 3, the method of operation not being described here since it is identical to that of the fourth variation.

The suspension of FIG. 5 is, by virtue of the opposing pneumatic springs, particularly suitable for the undercarriage of helicopters, for which it provides shock absorption without threshold, and also for test equipment wherein a suspension is required to be capable of absorbing relatively low frequency vibrations.

It frequently occurs that suspensions are required to be inclined. The gas of the pneumatic spring 2 can then, with the exception of the embodiment of FIG. 5, occupy the volume intended to be occupied by the hydraulic liquid when the suspension is in the operation position, i.e. substantially vertical, with the pneumatic spring 2 uppermost. In the embodiments illustrated in FIGS. 1 and 2, in the fully extended position, there is nothing to prevent the return of the gas to the pneumatic spring, whatever the previous inclination of the suspension, since the guide-rod 5 provides opposite piston 4 a permanent communication between the compression chamber 10 and the first extension chamber 11. In the embodiments illustrated in FIGS. 3 and 4, in contrast, this is obtained by an additional annular restricted portion 49 in the section of the guide-rod opposite the position occupied by the piston when the suspension is in the fully extended position, the orifices 33 being provided in the restricted portion 49.

It should be pointed out that the suspensions described are not limited in their uses to cases where they are supporting a constant static load only.

Referring once more to the suspension of FIG. 1, it is sufficient in order to avoid this limitation to extend groove 17 towards the top of the guide-rod 5 and groove 19 towards the lower part of cylinder 3 so that the areas defined on the guide-rod 5 and the cylinder 3 correspond partially with one another in order that in the compression phase the piston 4 uncovers groove 17 from a position corresponding to the minimum static load and in the extension phase the piston 4 uncovers groove 19 from a position corresponding to the maximum static load.

Similar measures taken with regard to the embodiments illustrated in the other Figures. would lead to the same result.

Thus suspensions are obtained which are suitable for the uses already described, namely for the landing gear of aircraft, auxiliary vehicle support bogies and land vehicles and test means.

We claim:

1. An oleopneumatic suspension, comprising:
   two hollow movable members which are movable relatively to each other, one of said movable members being movable within said other of said movable members;

piston means operatively intercoupled between said two movable members, said piston means having an equilibrium position, said piston means together with said one movable member separating the other of the two hollow members into at least first, second and third variable volume chambers, the volume of said second and said third chambers being variable and in opposition to each other, said three chambers each containing hydraulic liquid, said piston means having its face in contact with said liquid;

said one movable member including a hollow rod having one end enclosing a pneumatic spring and the other end fixed to said piston means, and said other movable member being a cylinder;

a guide rod fixed with a base of said other of said movable members;

said piston means comprising a first valve having an opening and including first throttle means between said first chamber and said second chamber, said first throttle means being oriented for providing for free flow in a first direction of the hydraulic liquid from said first chamber to said second chamber through said first valve and throttling the hydraulic liquid passing during its flow from said second chamber to said first chamber through said piston means, and a second valve having an opening and including second throttle means between said second chamber and said third chamber, said second throttling means being oriented for providing for free flow in a second direction of the hydraulic liquid opposite to said first direction from said second chamber to said third chamber and throttling the flow of the hydraulic liquid passing during its flow from said third chamber to said second chamber through said piston means;

said first throttling means cooperating with the opening of said first valve to provide throttling in a compression phase of said two hollow movable members and said second throttling means cooperating with the opening of said second valve to provide throttling in an extension phase of said two hollow movable members;

said first throttling means including a first throttling orifice cooperating with said first valve opening, and said second throttling means including a second throttling orifice cooperating with said second valve opening, said first throttling orifice having a cross-sectional opening greater than the cross-sectional opening of said second throttling orifice;

by-pass groove means, including one by-pass means in said second chamber and another by-pass means in said third chamber and each of said by-pass means having a portion beginning substantially proximate to said piston means when in its said equilibrium position;

said by-pass groove means including a pair of grooves in the outer face of said guide rod, one of said pair of grooves being longer than the other, said longer groove extending past said piston means and connecting said first and said second chambers when said piston means is in said neutral postion, and said one of said two by-pass grooves being shorter and being only in said second chamber in said equilibrium position; and each of said grooves having an effective section which varies in dependence on the position and the direction of displacement of said piston means in the outer of said two hollow movable members so that over at least one predetermined distance on both sides of said equilibrium position of said piston means, under load or in the absence of an external load being applied, said first and said second grooves which provide throttling in the compression and extension phases have cross-sections which are respectively greater than those of said first throttling orifice ensuring throttling in the compression phase and said second throttling orifice ensuring throttling in the extension phase for the remainder of the distance which said piston means moves.

2. The suspension as claimed in claim 1, wherein said by-pass groove means also includes:
  a first groove on a wall of said other movable member extending past said piston means and extending from said second chamber past said piston means into said third chamber, and
  a second groove on said wall of said other movable member in said third chamber.

3. The suspension of claim 1, wherein said throttle orifices in the compression phase have greater cross-sections than the throttle orifices in the extension phase for every position of said piston means.

4. The suspension according to claim 1, wherein the cross-section of said throttle orifices effective upon every displacement of said piston means out of said equilibrium position is greater than that of the orifices effective upon every displacement of said piston means into said equilibrium position for both said compression phase and said extension phase.

5. The suspension according to claim 1, in which said second throttling means comprises at least one internal portion of said outer hollow member extending axially on both sides of said equilibrium position of said piston means and defining with said piston means orifices of variable section in the extension phase for throttling the hydraulic liquid passing from said third chamber to said second chamber.

6. The suspension as claimed in claim 1, wherein said first chamber is a first extension chamber, the second chamber is a compression chamber, and said third chamber is a second extension chamber.

7. The suspension of claim 1, wherein the pneumatic spring is pressurized gas above the liquid contained within said one movable member.

8. The suspension of claim 1, wherein said other of the two hollow members is an outer member.

9. An oleopneumatic suspension for use in an aircraft landing gear, comprising:
  two hollow movable members which are movable relatively to each each other, one of said movable members being movable within said other of said movable members, said one of said movable members being adapted for coupling to the frame of the aircraft and the other of said movable members being coupled to a landing wheel of the aircraft;
  piston means operatively intercoupled between said two movable members and including first and second valves, said piston means having an equilibrium position, said piston means together with said one movable member separating the other of the two hollow members into at least first, second and third variable volume chambers, said first chamber being enclosed by said piston means and said one hollow movable member, said second chamber being enclosed by said piston means and said other hollow movable member, and said third chamber being enclosed by said piston means and said one and said other hollow movable members, the volume of said second and said third chambers being variable in opposition to each other, said three chambers each containing hydraulic liquid and said piston means having its face in contact with said liquid;

a guide rod fixed to a base of said other movable member;

said first valve having an opening and including first throttle means between said first chamber and said second chamber, said first throttle means being oriented for providing for free flow in a first direction of the hydraulic liquid from said first chamber to said second chamber through said first valve and throttling the hydraulic liquid passing during its flow from said second chamber to said first chamber through said piston means;

a second valve having an opening and including second throttle means between said second chamber and said third chamber, said second throttling means being oriented for providing for free flow in a second direction of the hydraulic liquid opposite to said first direction from said second chamber to said third chamber and throttling the flow of the hydraulic liquid passing during its flow from said third chamber to said second chamber through said piston means;

said first throttling means cooperating with the opening of said first valve to provide throttling in a compression phase of said two hollow movable members and said second throttling means cooperating with the opening of said second valve to provide throttling in an extension phase of said two hollow movable members;

said first throttling means including a first throttling orifice cooperating with said first valve opening, and said second throttling means including a second throttling orifice cooperating with said second valve opening, said first throttling orifice having a cross-sectional opening greater than the cross-sectional opening of said second throttling orifice;

by-pass groove means, including one by-pass means in said second chamber and another by-pass means in said third chamber and each of said by-pass means having a portion beginning substantially proximate to said piston means when in its said equilibrium position;

said by-pass groove means including a pair of grooves in the outer face of said guide rod, one of said pair of grooves being longer than the other, said longer groove extending past said piston means and connecting said first and said second chambers when said piston means is in said neutral position, and said one of said two by-pass grooves being shorter and being only in said second chamber in said equilibrium position; and each of said grooves having an effective section which varies in dependence on the position and the direction of displacement of said piston means in the outer of said two hollow movable members so that over at least one predetermined distance on both sides of said equilibrium postion of said piston means, under load or in the absence of an external load being applied, said first and said second grooves which provide throttling in the compression and extension phases have cross-sections which are respectively greater than those of said first throttling orifice ensuring throttling in the compression phase and said second throttling orifice ensuring throttling in the extension phase for the remainder of the distance which said piston means moves;

whereby the suspension is operative in an extension phase or a compression phase so that in the extension phase any displacement out of the equilibrium position will be braked by throttling through said second valve and said other by-pass means in said third chamber, and in the compression phase any displacement out of the equilibrium position will be braked by throttling through said first valve and said one by-pass means in said second chamber.

10. The suspension as claimed in claim 9, wherein said by-pass groove means also includes:

a first groove on a wall of said other movable member extending past said piston means and extending from said second chamber past said piston means into said third chamber, and a second groove on said wall of said other movable member in said third chamber.

11. The suspension of claim 9, wherein said throttle orifices in the compression phase have greater cross-sections than the throttle orifices in the extension phase for every position of said piston means.

12. The suspension according to claim 9, wherein the cross-section of said throttle orifices effective upon every displacement of said piston means out of said equilibrium position is greater than that of the orifices effective upon every displacement of said piston means into said equilibrium position for both said compression phase and said extension phase.

* * * * *